(12) United States Patent
Bernett et al.

(10) Patent No.: US 6,646,821 B2
(45) Date of Patent: Nov. 11, 2003

(54) EARLY LEAK DETECTION SYSTEM FOR A DISC DRIVE CONTAINING A LOW-DENSITY GAS

(75) Inventors: Frank William Bernett, Longmont, CO (US); Louis J. Fioravanti, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/071,011

(22) Filed: Feb. 7, 2002

(65) Prior Publication Data

US 2003/0007280 A1 Jan. 9, 2003

Related U.S. Application Data

(60) Provisional application No. 60/337,635, filed on Nov. 2, 2001, and provisional application No. 60/304,093, filed on Jul. 9, 2001.

(51) Int. Cl.[7] ................................................ G11B 27/36
(52) U.S. Cl. .................. 360/31; 360/53; 360/97.02; 360/75
(58) Field of Search .................... 360/31, 53, 97.02, 360/75, 69, 73.03, 77.08, 78.14; 324/210, 212, 226

(56) References Cited

U.S. PATENT DOCUMENTS

| 4,514,672 A | 4/1985 | O'Gwynn |
| 5,798,459 A | 8/1998 | Ohba et al. |
| 6,144,178 A | 11/2000 | Hirano et al. |
| 6,167,749 B1 | 1/2001 | Yanagisawa et al. |

FOREIGN PATENT DOCUMENTS

| EP | 0 635 785 A1 | 1/1995 |
| WO | WO 96/10824 | 4/1996 |
| WO | WO 98/37548 | 8/1998 |

*Primary Examiner*—Alan T. Faber
(74) *Attorney, Agent, or Firm*—Merchant & Gould P.C.

(57) ABSTRACT

A method of detecting that a concentration of a low-density gas such as helium in a disc drive is in danger of reaching an unacceptable level includes monitoring a signal varying in response to variations in the concentration of the gas in the disc drive. A criterion is determined based on the signal where the criterion indicates that the gas level is about to reach the unacceptable level. Finally, a flag is set once the criterion is met. A disc drive containing a low-density gas such as helium includes a sensor within the drive that produces a signal responsive to variations in the concentration of the low-density gas in the disc drive. The disc drive also includes a processor that monitors the signal and sets a flag if a predetermined criterion is met.

24 Claims, 5 Drawing Sheets

EARLY LEAK DETECTION SYSTEM FOR A DISC DRIVE CONTAINING A LOW-DENSITY GAS

RELATED APPLICATIONS

This application claims priority of U.S. provisional application Ser. No. 60/304,093, filed Jul. 9, 2001 and U.S. provisional application Ser. No. 60/337,635, filed Nov. 2, 2001.

FIELD OF THE INVENTION

This application relates generally to disc drives and more particularly to a disc drive leak detection system for a disc drive containing a low-density gas other than air.

BACKGROUND OF THE INVENTION

A disc drive typically includes a base to which various components of the disc drive are mounted. A top cover cooperates with the base to form a housing that defines an internal, sealed environment for the disc drive. The components include a spindle motor, which rotates one or more discs at a constant high speed. Information is written to and read from tracks on the discs through the use of an actuator assembly. The actuator assembly includes actuator arms, which extend towards the discs, with one or more flexures extending from each of the actuator arms. Mounted at the distal end of each of the flexures is a head, which includes an air bearing slider enabling the head to fly in close proximity above the corresponding surface of the associated disc.

Filling disc drives with low-density gases other than air (i.e., a gas having a density lower than air at similar pressures) can enhance their performance. For example, low-density inert gases such as helium can reduce the aerodynamic drag between the discs and their associated read/write heads by a factor of approximately five-to-one compared to operating in air. This reduced drag results in reduced power requirements for the spindle motor. A helium filled drive thus uses substantially less power than a comparable disc drive that operates in an air environment. At the same time, the helium gas conducts away heat generated during operation of the disc drive more effectively than air.

Despite the advantages of helium filled drives, such drives have not been commercially successful. This is mainly due to problems associated with the helium leaking from the disc drives over time. As the helium leaks out, air leaks in causing undesirable effects in the operation of the disc drives and possibly causing the disc drives to fail. For example, the increased concentration of air may increase the forces on the read/write head due to turbulent airflow within the drive and it may cause noise and/or the heads to fly at too great a distance above the discs. The risk of unexpected failure due to inadequate amounts of helium is a considerable drawback to helium disc drives, especially because the data stored within the disc drive can be irretrievably lost if the disc drive fails.

Accordingly there is a need for an improved drive that can effectively use helium without the risk of the disc drive unexpectedly crashing due to a low helium concentration. The present invention provides a solution to this and other problems, and offers other advantages over the prior art.

SUMMARY OF THE INVENTION

Against this backdrop the present invention has been developed. In accordance with one embodiment of the present invention, a method detects that a concentration of a low-density gas (such as helium) in a disc drive is in danger of reaching an unacceptable level. The method includes monitoring a signal that varies in response to variations in the concentration of the gas in the disc drive and determining a criterion based on the monitored signal. The criterion is chosen to indicate whether the disc drive is in danger of not performing satisfactorily due to a low concentration of the gas in the disc drive. This concentration is not necessarily unacceptable itself, but it indicates that the concentration is in danger of reaching an unacceptable level. The method also includes setting a flag when the criterion has been met. This flag may trigger a warning to the user or it may trigger other functions within the disc drive, such as automatically backing up the data from the disc drive.

Another embodiment of the present invention is a disc drive containing a low-density gas such as helium and including a gas leak detection system. The detection system includes a sensor within the drive producing a signal responsive to variations in the concentration of the gas in the disc drive. The sensor could be a read/write transducer and the signal could be an amplitude of the read signal representing the fly height of the transducer or a position error signal representing nonrepeatable runout. The signal may also represent the run current of a spindle motor or the measured disc mode vibrations of a separate accelerometer positioned on or within the disc drive.

The present invention can further be implemented as a disc drive including a housing containing a low-density gas other than air. The disc drive includes means for detecting whether the disc drive is in danger of not performing satisfactorily due to a low concentration of the gas in the disc drive. The detecting means preferably includes means for receiving a signal that varies in response to variations in the concentration of the low-density gas in the disc drive and a further means for determining whether a criterion based on the signal has been met.

These and various other features as well as advantages which characterize the present invention will be apparent from a reading of the following detailed description and a review of the associated drawings.

DETAILED DESCRIPTION

Figure 1:
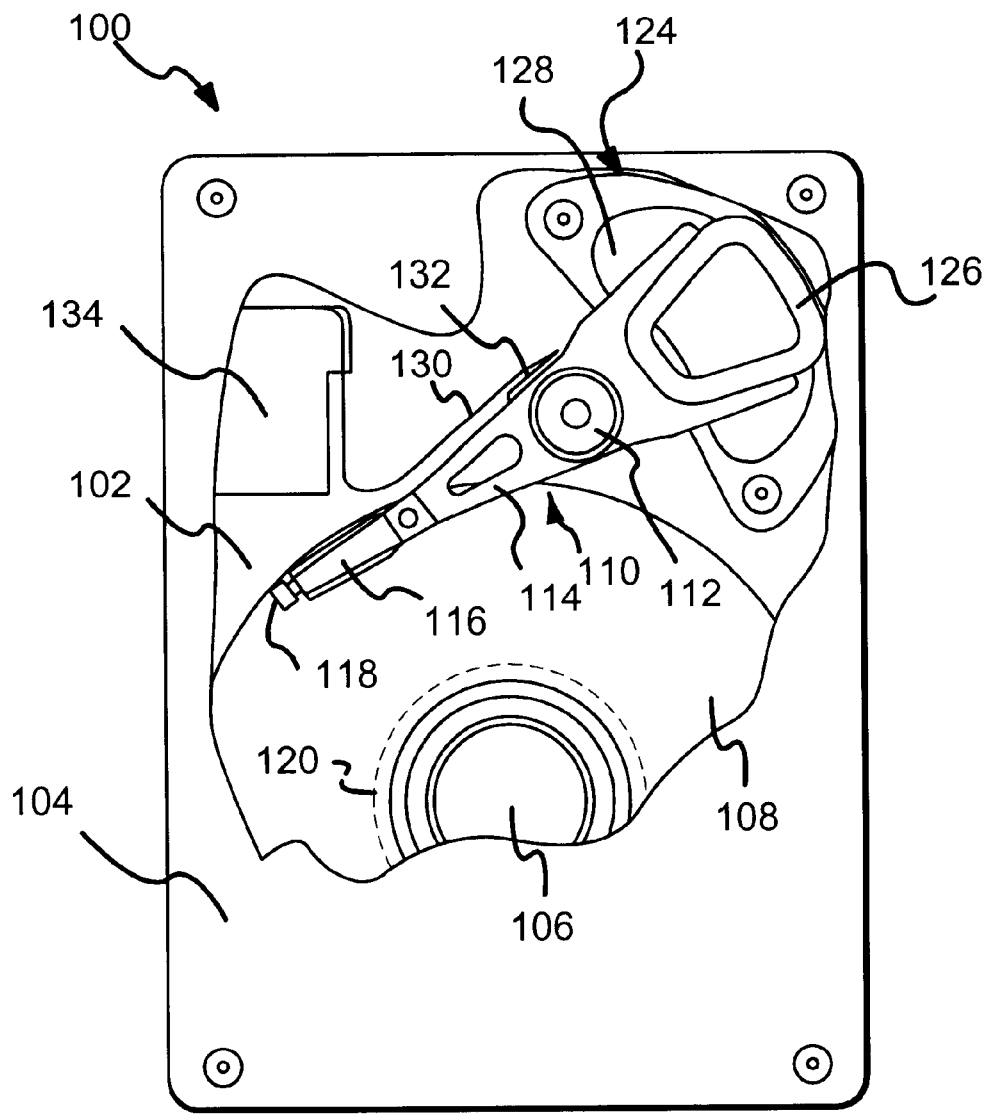
FIG. 1 is a plan view of a disc drive incorporating a preferred embodiment of the present invention showing the primary internal components.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form a housing that defines an internal, sealed environment for the disc drive in a conventional manner. The sealed environment of the disc drive 100 is filled with helium to enhance the performance of the disc drive 100. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over a park zone 120 near the inner diameter of the discs 108 when the drive motor is de-energized. The heads 118 are secured over the park zone 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
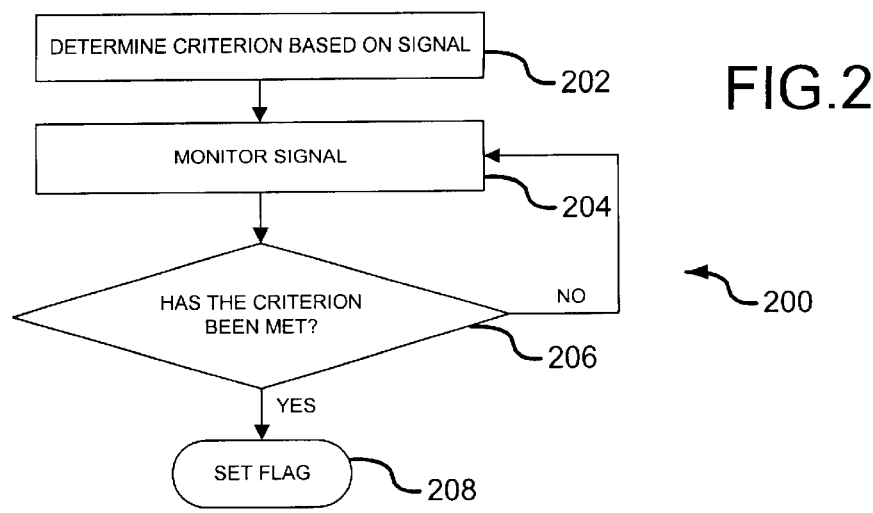
FIG. 2 is a flow chart of a general leak detection method in accordance with a preferred embodiment of the present invention.

Referring now to FIGS. 1–2, a method 200 of detecting that the concentration of a low-density gas other than air (e.g., helium) in a disc drive 100 is in danger of falling to an unacceptable level will be described. In operation 202 a criterion is determined based on a signal. Preferably the signal represents a characteristic that will vary as the concentration of a gas in the disc drive 100 varies. The criterion based on that signal indicates that the concentration of the gas in the disc drive 100 is in danger of falling to an unacceptable level, and the criterion preferably indicates that the concentration will fall below an unacceptable level within a predetermined period of time.

In operation 204 the signal is monitored to determine in query operation 206 whether the criterion has been met. If the criterion has not been met, monitoring of the signal continues in operation 204. If the criterion has been met, indicating that the concentration of helium in the disc drive 100 will fall below an unacceptable level within a predetermined period of time then a flag is set in operation 208. Preferably, the flag is a warning flag that triggers a warning to the user that the concentration of helium will fall to an unacceptable level within the predetermined period of time. The user will also be instructed to remove any valuable data from the disc drive 100 within that predetermined period of time. For example, if the predetermined period of time were one month, the user would be instructed to remove all valuable data from the disc drive 100 within the next month. Alternatively, the flag can be a flag that triggers some other operation within or outside the disc drive 100. For example, the flag can trigger an automatic backup of the data stored in the disc drive 100.

By warning the user of the possibility of a failure in the disc drive 100 due to a low concentration of helium in the disc drive 100, the method 200 decreases the chances that the user's data will be lost due to a failure of the disc drive 100. Method 200 thereby increases the user's confidence in a helium filled disc drive 100 and makes such a disc drive 100 attractive to users.

Figure 3:
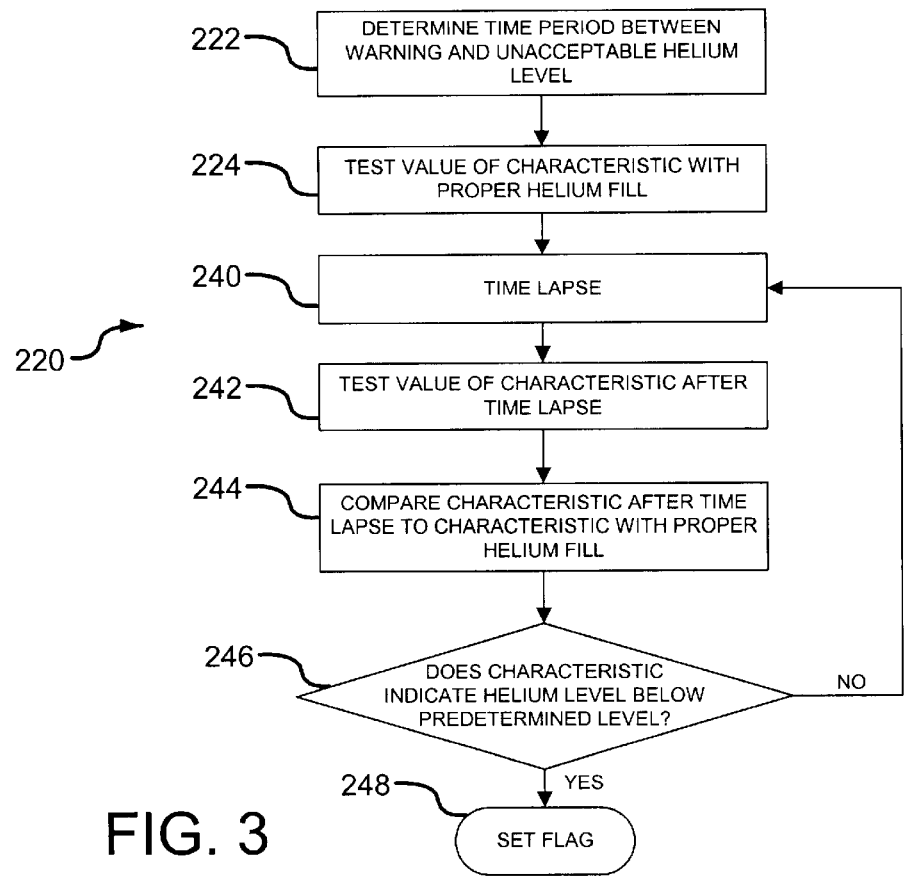
FIG. 3 is a flow chart of a specific preferred embodiment of the method of FIG. 2.

Referring now to FIG. 3, a method 220 is a more detailed embodiment of the method 200 described above. In operation 222, a period of time is determined between the warning that will be given and the time when the concentration of helium in the disc drive 100 will reach an unacceptable level. This period of time should be chosen so that the user has an adequate amount of time to retrieve any valuable data from the disc drive 100 before the concentration of helium reaches an unacceptable level. As an example, the time period could be chosen as one month.

In operation 224, the value of a characteristic is tested while the disc drive 100 is properly filled with an acceptable concentration of helium. An acceptable concentration of helium should be determined for a particular disc drive 100. Preferably, this is done by determining the number of read and/or write errors that occur in the disc drive 100 at particular levels of helium fill. As an example, an acceptable concentration of helium fill in a disc drive 100 might be 95% of helium in the disc drive 100. Thus, when the concentration of helium is at or above 95% the drive will operate properly and the number of read and/or write errors will be acceptable, but when the concentration of helium is below 95% the drive will have an unacceptable number of read and/or write errors. The number of acceptable read and/or write errors will vary depending on the drive and particularly the features of the drive that may compensate for read and/or write errors. However, techniques for determining acceptable numbers of read and/or write errors is known to those skilled in the art.

The characteristic may be any of a number of characteristics that indicate the concentration of helium in the disc drive 100. Furthermore, the characteristic may comprise a characteristic that is routinely measured during drive operation, or the characteristic may be specially measured for purposes of detecting helium leakage. For example, the characteristic might be the fly height of the head over the disc 108 (i.e., the distance between the head 118 and the corresponding disc surface during operation of the disc drive 100). The fly height will increase as more air leaks into the disc drive 100 and the concentration of the helium in the disc drive 100 decreases accordingly. As the fly height increases, the amplitude of the read signals produced by the head 118 will decrease. Thus, a drop in amplitude of the read signals indicates that the concentration of helium in the disc drive has also dropped. The read/write transducer of the head 118 acts as a sensor of the fly height characteristic by producing the read signals. Read signals can be monitored using an existing processor in the disc drive that incorporates existing monitoring techniques.

Figure 4:
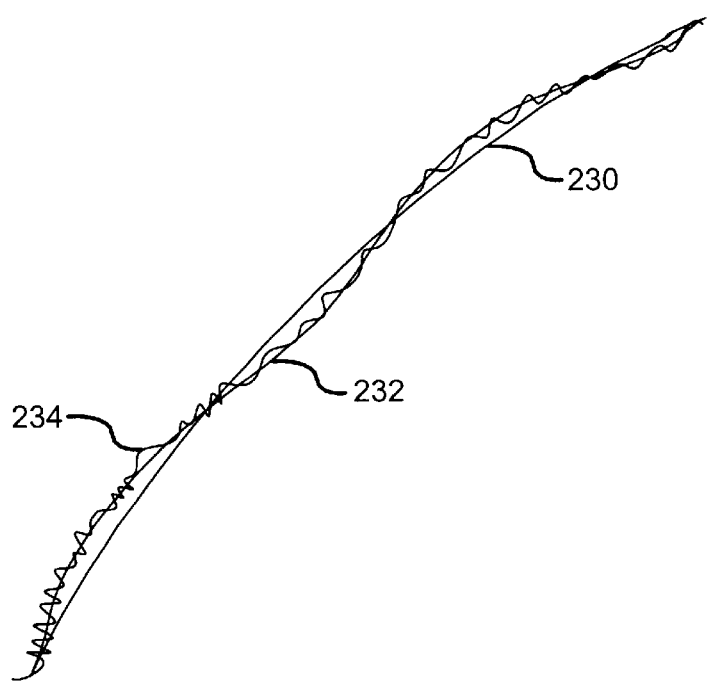
FIG. 4 is a plan view of an ideal track path, a track path including only repeatable runout, and a track path including repeatable and nonrepeatable runout.

Another example of a characteristic that will vary with the concentration of the helium in the disc drive 100 is nonrepeatable runout. FIG. 4 illustrates what is meant by nonrepeatable runout. A portion of an ideal circular track path is shown as 230. Referring to FIGS. 1 and 4, the track path 232 shows the path that a head 118 would follow if only repeatable runout were present. The path 232 does not follow exactly along the ideal circular path 230 because of tolerances in the disc stack on the spindle motor 106 such that the spindle motor 106 does not rotate the disc 108 in a perfectly circular path. However, the path 232 is repeatable in that the displacement from center is the same for each angle of disc rotation and the head will follow along that path when the head later attempts to track the ideal path 230. Thus, if only repeatable runout were present, the head 118 would follow essentially the same path 232 when writing information to the disc 108 and when reading information from the disc 108.

Realistically, however, the head actually follows a path 234 while attempting to track the ideal path 230 due to nonrepeatable runout. Because of nonrepeatable runout, the path 234 strays from the repeatable runout path 232. Thus, the nonrepeatable runout may be quantified as the variation of the actual path 234 of the head from the repeatable runout path 232. A position error signal produced by the read/write transducer of the head 118 indicates the distance between the actual head path 234 and the ideal track path 230. This position error signal may be used to quantify the nonrepeatable runout by factoring out the repeatable runout according to known techniques. The sensors and processors for monitoring the nonrepeatable runout position error signal are already common on disc drives and are known to those skilled in the art.

Figure 5:
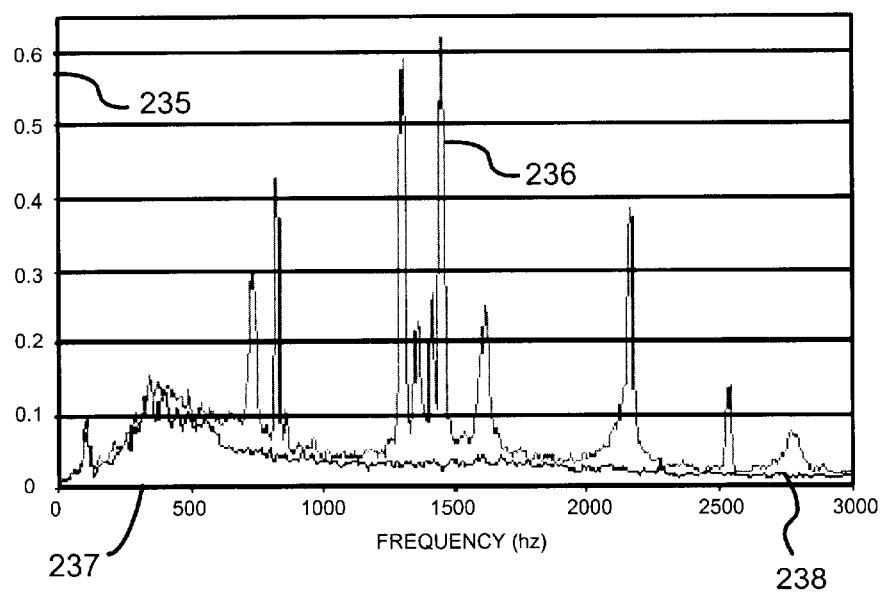
FIG. 5 is a chart comparing the nonrepeatable runout position error signal of a disc drive with a helium environment and a disc drive with an air environment.

FIG. 5 illustrates the difference in the nonrepeatable runout position error signal between a disc drive 100 filled with helium and a disc drive filled with air. The vertical axis 235 represents the percent of the track variation, or the percent of the track width that the head 118 has strayed due to nonrepeatable runout. Thus, if the track variation were 100%, the head 118 would have strayed by a full track width due to nonrepeatable runout. The horizontal axis 237 represents frequencies in the position error signal. Line 236 represents the position error signal in an air environment. The line 238 represents the position error signal in a helium environment. As can be seen, at several different frequencies the position error signal 236 in the air environment is drastically higher than the position error signal 238 in the helium environment. It is believed that these high magnitudes are due to certain components in the disc drive 100(e.g., the discs 108) vibrating at their resonance frequencies. The amplitudes of these resonance frequency vibrations (also known as "disc modes") are considerably less in a helium environment because of decreased turbulent airflows.

Accordingly, the nonrepeatable runout position error signal is considerably less over the same track in a helium environment than in an air environment. This is an advantage for helium filled disc drives. However, in addition to demonstrating the usefulness of the helium filled disc drive 100, this change in the nonrepeatable runout position error signal can be used to indicate the concentration of helium in a particular disc drive 100. That is, an increase in the value of the nonrepeatable runout position error signal indicates a corresponding decrease in the concentration of helium in the disc drive 100.

While the nonrepeatable runout position error signals and read signals are the most preferred signals to be monitored, several other characteristics and representative signals could also be used so long as they indicate the concentration of helium in the disc drive 100. For example, the drag on the discs 108 as they rotate is another characteristic that would indicate the concentration of helium in the disc drive 100. The representative signal of this characteristic could be the run current of the spindle motor 106. As the concentration of helium in the disc drive 100 decreases, the drag on the discs 108 increases, thereby requiring a greater run current to the spindle motor 106.

Figure 6:
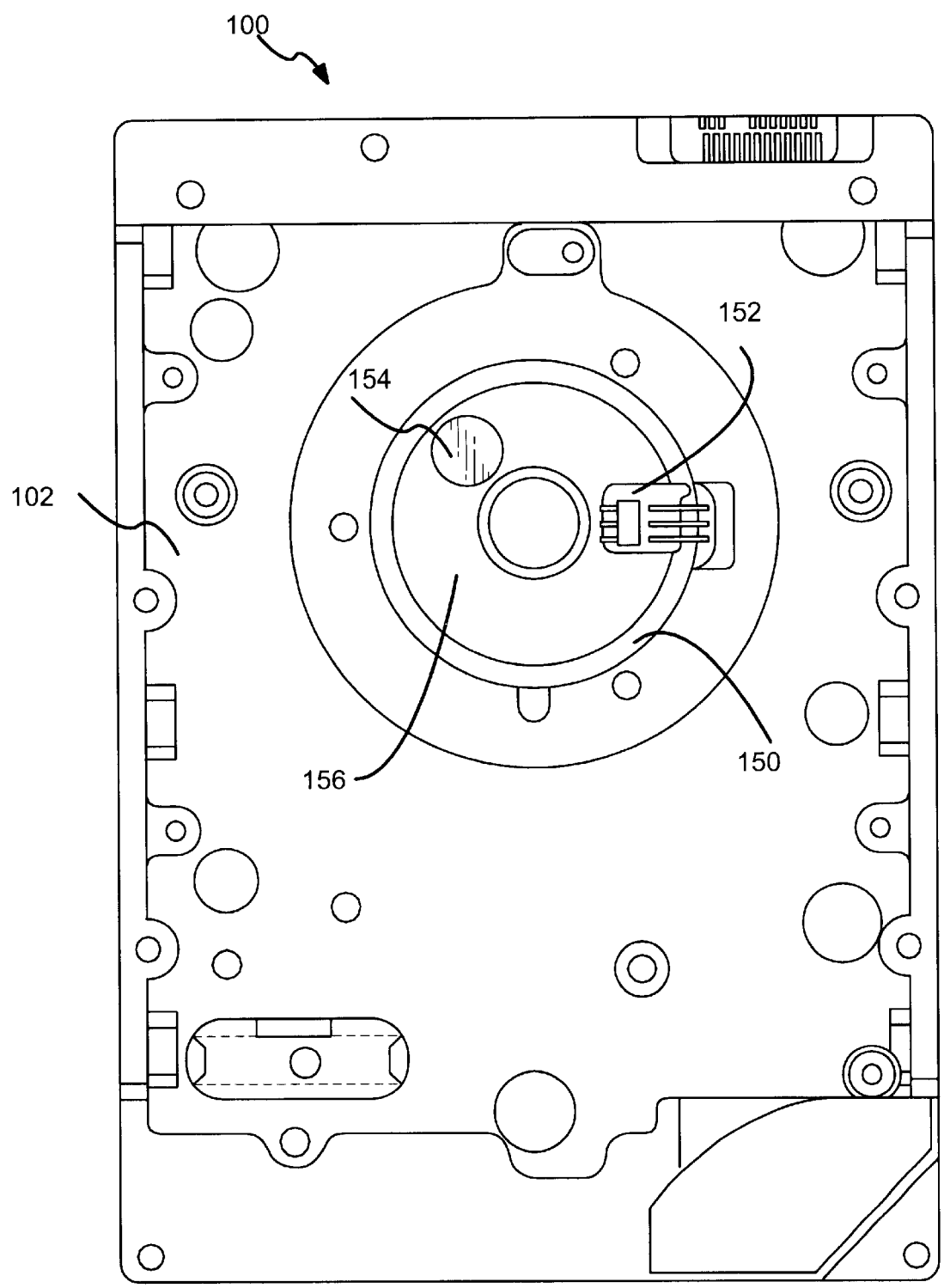
FIG. 6 is a plan view of a bottom side of the disc drive shown in FIG. 1 illustrating an accelerometer positioned on a spindle motor base of the disc drive.

While the above-described representative signals all may be generated from existing disc drive circuitry (e.g., nonrepeatable runout position error signals and read error signals), the present invention also encompasses the use of dedicated circuitry within a disc drive that is focused only on the detection of helium (or other low-density gas) leaks within the disc drive. For example, FIG. 6 illustrates a bottom surface of the disc drive base 102 which includes an opening (not shown) to allow a base 150 of the spindle motor 116 to extend below the disc drive base 102. An electrical connector 152 on the spindle motor base 150 is adapted to contact a similar connector on a printed circuit board (not shown) that is mounted to the bottom surface of the disc drive base 102. In one embodiment of the present invention, an accelerometer 154 is also mounted to a bottom surface 156 of the spindle motor base 150. The accelerometer 154 is preferably connected to additional circuitry on the printed circuit board (not shown) that monitors the magnitude of the vibrations experienced by the accelerometer 154. Known mathematical algorithms may be applied to the measured acceleration signals to determine the magnitude of vibrations at various frequencies, similar to the graph of position error signals shown in FIG. 5. That is, a plot of the vibrations measured by the accelerometer 154 in both a traditional (air-filled) drive and in a helium-filled drive would appear very similar to FIG. 5 where the magnitude of the known "disc modes" is much higher in air than in helium. This variation in the magnitude of the disc modes is used to set a criterion for determining when concentration of helium (or other low-density gas) will fall to an unacceptable level.

It should be noted that the position of the accelerometer 154 is not limited to the spindle motor base 150 as shown in FIG. 6. Indeed, the accelerometer 154 may be positioned on another portion of the drive base 102 or may be positioned within the interior volume of the disc drive 100 provided that the accelerometer 154 is capable of accurately measuring the magnitude of the vibrations at the known disc modes. Furthermore, while the present invention encompasses the use of dedicated leak detection sensors such as the accelerometer 154, it is preferred to utilize existing "measured characteristics" within the drive (such as nonrepeatable runout position error signals) to provide an accurate leak detection system without increasing the cost and complexity of the disc drive 100.

Referring back to FIG. 3, after a time lapse at operation 240 the value of the characteristic is tested in operation 242. The time lapse is preferably short enough to prevent significant drops in the helium concentration between testing in operation 242, but long enough that the tests in operation 242 are not overly burdensome to the system. For example, the time lapse could be twenty-four hours. This testing includes monitoring the signal that is representative of the characteristic, as described above. Furthermore, when the representative signal relates to read/write errors or position error signals, the testing preferably includes running the head 118 over the same track that was used to obtain the test value in operation 224 (i.e., a test track). It may be desirable to run the head 118 over several test tracks to assure an accurate assessment of the characteristic and the indicated helium concentration.

In operation 244 the value of the characteristic obtained in operation 242 after the time lapse in operation 240 is compared to the value of the characteristic obtained in operation 224 with proper helium fill. In query operation 246 it is determined whether the characteristic indicates a helium concentration below a predetermined warning level. This warning level is the criterion described above that preferably indicates the concentration of helium will reach the unacceptable level within the predetermined time period. The value of the characteristic or representative signal that corresponds to the predetermined warning level can be determined by first determining a helium concentration that should prompt the system to warn the user. This determination can easily be performed by one skilled in the art using a tested or estimated helium leak rate for the particular drive and determining the amount of helium fill that will allow for that leak rate during the predetermined period of time before reaching the unacceptable helium concentration level.

If the tested value of the characteristic indicates that the helium concentration is at or below the determined warning level, then a warning flag is set at operation 248 to warn the user that the disc drive 100 may fail after the predetermined period of time. As described above in method 200, the user will preferably also be instructed to remove any important data from the disc drive 100 within the predetermined period of time. If the value of the characteristic indicates that the helium concentration is above the predetermined warning level then a time lapse will be allowed in operation 240. After the time lapse, the method 220 will proceed to operation 242. The operations 240, 242, 244 and 246 will be repeated until the helium concentration falls to the predetermined warning level.

Figure 7:
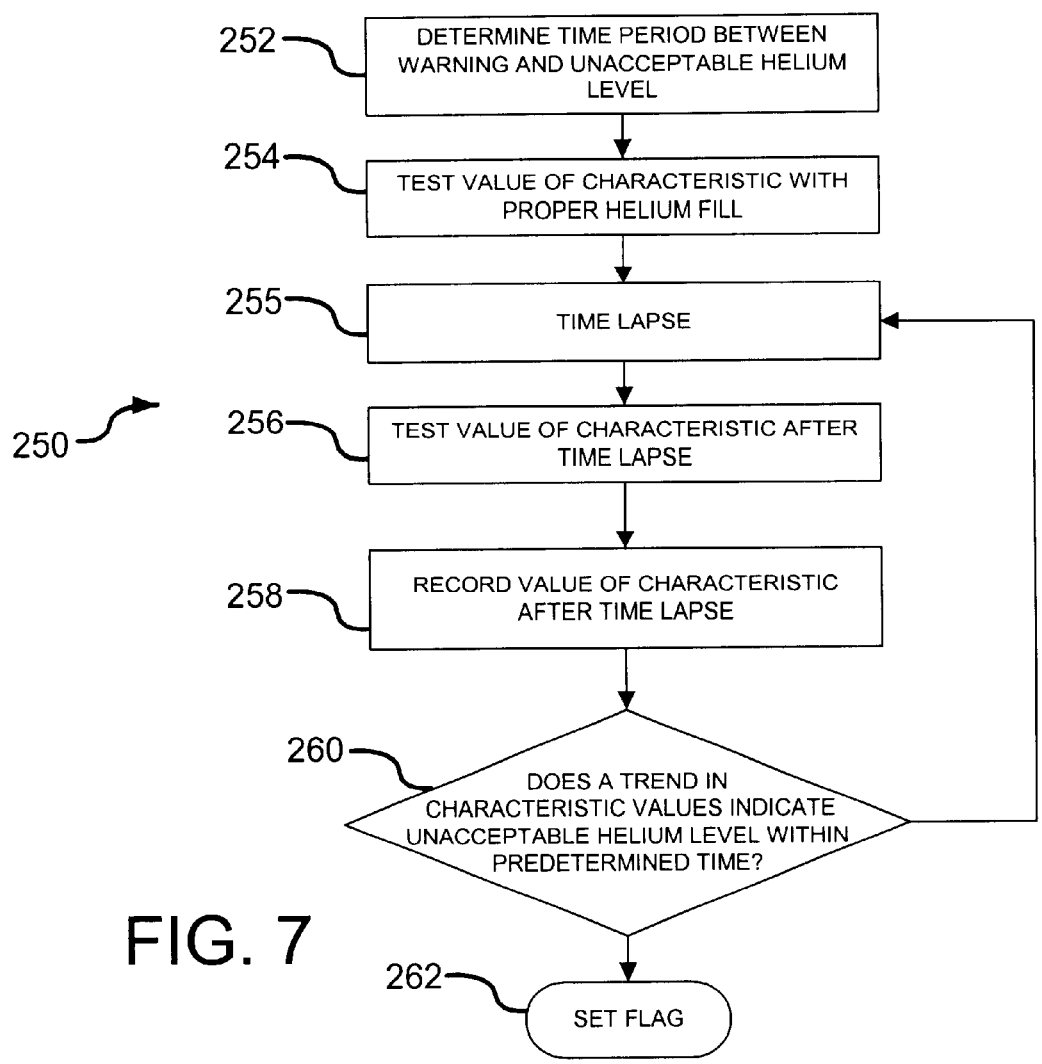
FIG. 7 is a flow chart of a specific alternative embodiment of the method of FIG. 2.

Referring now to FIG. 7, a specific alternative embodiment of the general method 200 will be described. In the method 250 a time period and an unacceptable concentration of helium are determined in operation 252 as in operation 222 of method 220 shown in FIG. 3. As in operation 224 of method 220, a test value of the characteristic determinative of the concentration of helium in the disc drive 100 is tested with a proper fill of helium in operation 254. As with method 220, the characteristic may be any characteristic that will indicate the concentration of helium in the disc drive 100.

After a time lapse in operation 255, a value of the characteristic is tested in operation 256 as in operation 242 of method 220. In operation 258, a value of the characteristic after the time lapse is recorded. This may be done by simply recording the value of the representative signal. As an example, the value may be recorded on a designated area of a disc 108 of the disc drive 100. In query operation 260 it is determined whether a trend in characteristic values indicates an unacceptable helium concentration will be reached within the predetermined period of time. In this embodiment, this trend is the criterion that preferably indicates an unacceptable level of helium will be reached within the predetermined period of time. For example, query operation 260 may first determine the rate of change of the characteristic based on prior recorded characteristic values and then use that rate along with the last recorded value of the characteristic to determine whether the characteristic will reach a value indicating an unacceptable concentration of helium in the disc drive 100 in the predetermined period of time. If such a trend is present, then a warning flag is set in operation 262 to warn the user and instruct the user to remove any important data from the disc drive 100 within the predetermined period of time. If the trend does not indicate that an unacceptable concentration of helium will be reached within the predetermined period of time, then the method 250 returns to operation 255 and a time lapse occurs. Operations 255, 256, 258 and 260 are repeated until a trend indicates that an unacceptable concentration of helium will be reached within the predetermined period of time.

Method 220 may be preferred because it is simpler than the method 250. However, the method 250 should be more accurate in setting a warning flag at the appropriate time because it accounts for varying leakage rates of helium from the particular disc drivel 100.

Described in another way, a method (such as 200) in accordance with an exemplary preferred embodiment of the present invention detects that a concentration of a low-density gas in a disc drive (such as 100) is in danger of reaching an unacceptable level. The method includes monitoring a signal (such as in operation 204) that varies in response to variations of the concentration of the gas in the disc drive and determining (such as in operation 202) a criterion based on the monitored signal where the criterion is chosen to indicate whether the disc drive is in danger of not performing satisfactorily due to a low concentration of the gas in the disc drive. The method also includes setting a flag (such as in operation 208) when a determination is made (such as in operation 206) that the criterion has been met.

The signal may be a position error signal indicating the position of the head (such as 118) relative to a data track on the disc (such as 108). The position error signal preferably represents nonrepeatable runout. The signal may be a read signal representing a fly height of the head (such as 118) above the surface of the disc (such as 108). The disc drive (such as 100) may include a spindle motor (such as 106) rotating a disc (such as 108) and the signal may represent a run current of the spindle motor. Additionally, the disc drive (such as 100) may include an accelerometer (such as 154) and the signal may represent an amplitude of a disc mode vibration measured by the accelerometer (such as 154).

The criterion may correspond to a selected value of the signal. Alternatively, the criterion may represent a trend in values of the signal. The criterion preferably indicates that the level of the gas in the disc drive will reach an unacceptable level within a predetermined period of time.

Monitoring the signal preferably includes periodically monitoring the signal, and it preferably includes receiving the signal while rotating a disc of the disc drive with a head of the disc drive positioned over a test track of the disc.

Another embodiment of the present invention may be described as a disc drive (such as 100) containing a low-density gas such as helium and including a gas leak detection system. The detection system includes a sensor (such as 118 or 154) within the drive producing a signal responsive to variations in the concentration of the gas in the disc drive. The detection system also includes a processor that monitors the signal and which is operable to set a flag if a predetermined criterion has been met.

The disc drive (such as 100) preferably includes a disc (such as 108) and a head (such as 118) flying a predetermined height over the surface of the disc (such as 100). In one embodiment, the sensor is a transducer on the head (such as 118) that reads and writes data to a surface of the disc (such as 108) and the transducer produces the signal while positioned over a track of the rotating disc. The signal may be a read signal representing the fly height of the transducer or a position error signal representing nonrepeatable runout. The disc drive (such as 100) may include a spindle motor (such as 106) rotating the disc (such as 108) and the signal may represent a run current of the spindle motor. Additionally, the disc drive (such as 100) may include an accelerometer (such as 154) and the signal may represent an amplitude of a disc mode vibration measured by the accelerometer (such as 154).

Yet another embodiment of the present invention may be described as a disc drive (such as 100) including a housing (such as 102 and 104) containing a low-density gas other than air. The disc drive also includes means for detecting whether the disc drive is in danger of not performing satisfactorily due to a low concentration of the gas in the disc drive.

The means for detecting preferably includes means for receiving a signal that varies in response to variations in the concentration of the low-density gas in the disc drive. In a preferred embodiment, the means for detecting also includes means for determining whether a criterion based on the signal has been met by monitoring the signal.

It will be clear that the present invention is well adapted to attain the ends and advantages mentioned as well as those inherent therein. While embodiments have been described for purposes of this disclosure, various changes and modifications may be made which are well within the scope of the present invention. For example, multiple characteristics could be monitored at the same time to assure an accurate representation of the concentration of helium in the disc drive. Additionally, different mathematical algorithms may be applied to the measured signal (such as an integration of the signals) so that the criterion may be based on a total value of the characteristic measured over time as opposed to a predetermined value of the signal or a recognizable trend in the signals. Numerous other changes may be made which will readily suggest themselves to those skilled in the art and which are encompassed in the scope of the invention disclosed and as defined in the appended claims.

What is claimed is:

1. In a disc drive containing a low-density gas other than air, a method of detecting that a concentration of the gas in the disc drive is in danger of reaching an unacceptable level, the method comprising:

(a) monitoring a signal varying in response to variations in the concentration of the gas in the disc drive;

(b) determining a criterion based on the monitored signal, the criterion indicating that the disc drive is in danger of not performing satisfactorily due to a low concentration of the gas in the disc drive; and (c) setting a flag when the criterion is met.

2. The method of claim 1, wherein the disc drive comprises a rotating disc and a head for reading magnetic properties of the disc, and wherein the monitoring step (a) comprises receiving the signal while rotating the disc with the head of the disc drive positioned over a track of the disc.

3. The method of claim 2, wherein the signal is a position error signal indicating the position of the head relative to the track on the disc.

4. The method of claim 2, wherein the signal is a read signal representing a fly height of the head above the disc.

5. The method of claim 1, wherein the disc drive comprises a spindle motor rotating a disc and the signal represents a run current of the spindle motor.

6. The method of claim 1, wherein the disc drive includes an accelerometer and the signal represents an amplitude of a disc mode measured by the accelerometer.

7. The method of claim 1, wherein the criterion corresponds to a selected value of the signal.

8. The method of claim 1, wherein the criterion represents a trend in values of the signal.

9. The method of claim 1, wherein the criterion indicates that the level of the gas in the disc drive will reach an unacceptable level within a predetermined period of time.

10. The method of claim 1, wherein the gas is helium.

11. The method of claim 1, wherein the monitoring step (a) further comprises periodically monitoring the signal.

12. A disc drive containing a low-density gas other than air and comprising a gas leak detection system, the leak detection system comprising:

a sensor within the disc drive producing a signal responsive to variations in the concentration of the low-density gas in the disc drive; and a processor that monitors the signal, the processor operable to set a flag if a predetermined criterion is met.

13. The disc drive of claim 12, wherein the criterion indicates that the concentration of the gas in the disc drive will reach an unacceptable level within a predetermined period of time.

14. The disc drive of claim 13, wherein the processor only monitors the signal periodically.

15. The disc drive of claim 13, further comprising a rotating disc and a head flying a predetermined height over a surface of the rotating disc, and wherein the sensor is a transducer on the head that reads and writes data to a data track of the rotating disc.

16. The disc drive of claim 15, wherein the signal is a position error signal representing nonrepeatable runout.

17. The disc drive of claim 15, wherein the signal is a read signal representing a fly height of the transducer above the disc.

18. The disc drive of claim 13, further comprising a spindle motor rotating a disc, and wherein the signal represents a run current of the spindle motor.

19. The method of claim 13, wherein the disc drive includes an accelerometer and the signal represents an amplitude of a disc mode measured by the accelerometer.

20. The disc drive of claim 13, wherein the criterion is a selected value of the signal.

21. The disc drive of claim 13, wherein the criterion is a trend in values of the signal.

22. A disc drive comprising:

a housing containing a low-density gas other than air; and means for detecting whether the disc drive is in danger of not performing satisfactorily due to an insufficient concentration of the gas in the disc drive.

23. The disc drive of claim 22, wherein the means for detecting comprises:

means for receiving a signal that varies in response to variations in the concentration of the gas in the disc drive.

24. The disc drive of claim 23, wherein the means for detecting further comprises:

means for determining whether a criterion based on the signal has been met by monitoring the signal.

* * * * *